US006974384B2

(12) United States Patent
Schmidt

(10) Patent No.: US 6,974,384 B2
(45) Date of Patent: Dec. 13, 2005

(54) TAILINGS CONVEYOR WITH ROTARY IMPELLERS DISPOSED AND ROTATABLE AT PROGRESSIVELY FASTER SPEEDS FOR THRESHING AND CONVEYING TAILINGS THROUGH THE CONVEYOR AND METHOD OF OPERATION OF THE SAME

(75) Inventor: James R. Schmidt, Blue Grass, IA (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/903,943

(22) Filed: Jul. 30, 2004

(65) Prior Publication Data

US 2005/0009592 A1 Jan. 13, 2005

Related U.S. Application Data

(63) Continuation-in-part of application No. 10/340,263, filed on Jan. 10, 2003, now abandoned.

(51) Int. Cl.[7] .............................................. A01D 17/02
(52) U.S. Cl. ............................. 460/114; 460/13; 460/14
(58) Field of Search ........................... 460/114, 13, 14, 460/12, 70, 76, 119

(56) References Cited

U.S. PATENT DOCUMENTS

| 1,406,394 | A | * | 2/1922 | Junkin ......................... 460/63 |
| 1,781,198 | A | * | 11/1930 | Scranton, Jr. ................. 460/13 |
| 2,309,736 | A | * | 1/1943 | Makin ......................... 460/14 |
| 2,875,768 | A | * | 3/1959 | Hockey et al. ............... 460/14 |
| 3,247,855 | A | * | 4/1966 | Kepkay ....................... 460/14 |
| 3,324,860 | A | * | 6/1967 | Kepkay ....................... 460/11 |
| 3,976,084 | A | * | 8/1976 | Weber ......................... 460/14 |
| 4,062,366 | A | * | 12/1977 | De Coene .................... 460/14 |
| 4,136,507 | A | | 1/1979 | Hobbs ......................... 56/126 |
| 4,292,981 | A | * | 10/1981 | De Busscher et al. ........ 460/14 |
| 4,584,824 | A | | 4/1986 | Hiyamuta .................... 56/13.9 |
| 5,076,046 | A | | 12/1991 | Schilling .................... 56/327.1 |
| 5,138,826 | A | | 8/1992 | Hobbs ......................... 56/14.6 |
| 5,205,114 | A | | 4/1993 | Hobbs ......................... 56/14.6 |
| 5,297,745 | A | | 3/1994 | Vinyard .................... 241/101.7 |
| 5,497,605 | A | * | 3/1996 | Underwood et al. ......... 56/14.6 |
| 5,498,206 | A | * | 3/1996 | Underwood et al. .......... 460/14 |
| 6,390,915 | B2 | | 5/2002 | Brantley et al. ............ 460/131 |
| 6,669,558 | B1 | * | 12/2003 | Wolters et al. ............... 460/14 |

* cited by examiner

*Primary Examiner*—Árpád Fábián Kovács
(74) *Attorney, Agent, or Firm*—Brant T. Maurer; Rebecca Henkel

(57) ABSTRACT

A tailings conveyor includes a housing for receiving tailings from the cleaning system, a first rotary impeller having threshing portions rotatable at a first speed for accelerating and propelling tailings along a predetermined path in the housing, and at least one additional impeller having threshing portions rotatable at a greater rotational speed for further accelerating and propelling the tailings along the path, such that the tailings collide with others of the tailings and against and along an interior surface of the housing for threshing the tailings, such that the tailings are progressively accelerated and threshed as they are conveyed through the conveyor. At least the first and second impellers are located in closely spaced relation for defining a threshing area within the housing and preventing build up of tailings that could lead to clogging and loss of efficiency and tailings throughput.

24 Claims, 6 Drawing Sheets

TAILINGS CONVEYOR WITH ROTARY IMPELLERS DISPOSED AND ROTATABLE AT PROGRESSIVELY FASTER SPEEDS FOR THRESHING AND CONVEYING TAILINGS THROUGH THE CONVEYOR AND METHOD OF OPERATION OF THE SAME

This application is a Continuation-In-Part of U.S. patent application Ser. No. 10/340,263, filed Jan. 10, 2003 now abandoned.

TECHNICAL FIELD

This invention relates generally to an agricultural combine, and more particularly, to a tailings conveyor and method of operation thereof for conveying tailings from a cleaning system of the combine, which conveyor includes at least two rotary impellers which are sequentially positioned and rotated at progressively faster speeds for propelling tailings along a predetermined path through a housing of the conveyor and simultaneously threshing the tailings.

BACKGROUND ART

Typically, an agricultural harvesting machine such as a combine gathers crop from a field and transports the crop by means of a feeder house to a threshing and separating device located inside the combine. Generally, threshing refers to removing grain, beans, seeds or kernels, hereinafter referred to as just grain, which are desired to be collected, from husks, cobs, pods, stems, hulls and other portions of the plants being harvested, which are to be discarded. The threshing and separating device delivers the crop to the cleaning system of the combine, which includes a plurality of sieves. An upper sieve allows clean grain and some material other than grain (MOG) to fall through it, and a lower sieve is adjusted so that only clean grain is allowed to pass through it. The material including the clean grain and MOG that falls through the upper sieve, but does not pass through the lower sieve, is called tailings. In many cases the MOG will include pods, husks, or cob fragments or hulls that contain or hold grain, and thus it is desired for this material to be threshed and/or cleaned again to recover this grain.

Prior methods accomplish the threshing and/or cleaning of the tailings by conveying them to one side of the combine with an auger. The tailings are then carried by a conveyor, typically a paddle and chain conveyor, back to the combine threshing mechanism. Some combines have used a rethreshing device which is separate from the threshing system which helps save capacity on the threshing system by rethreshing the tailings separately from new crop coming into the combine. The auger feeds material into the rethreshing device and then the material is conveyed back to the cleaning system. Both single impeller/blowers and augers have been used to convey this material back to the cleaning system. These rethreshing devices are usually convertible, enabling the operator to manipulate the machine to be more or less aggressive, depending on the vulnerability of the grain to damage, during processing.

Prior methods for conveying the tailings material are inefficient in terms of throughput capacity and power consumption. Some known embodiments have resulted in large conveying devices that tend to limit access to both the combine and the conveying device for maintenance and conversion.

Therefore, what is needed is a more efficient means for conveying tailings, which overcomes many of the limitations and shortcomings set forth above, is more versatile, and can be adapted for providing a desired threshing function as the tailings are conveyed thereby.

SUMMARY OF THE INVENTION

What is disclosed is a tailings conveyor which threshes tailings as they are conveyed therethrough, so as to provide one or more of the capabilities and overcome one or more of the limitations and shortcomings set forth above.

According to one aspect of the invention, the tailings conveyor includes a housing including an interior cavity, an inlet opening connecting with the cavity for receiving tailings from the cleaning system into the cavity, and an outlet opening for discharging the tailings from the cavity. The conveyor includes a first rotary impeller supported for rotation about a first rotational axis in the cavity at a position adjacent to the inlet opening and an interior surface of the housing, the first impeller including a plurality of blades extending radially outwardly from a first hub to radial outer threshing portions or tips of the blades, and a first drive connected in driving relation to the first hub for rotating the first impeller such that the threshing portions or tips thereof will rotate at a predetermined first rotational speed or within a first rotational speed range. In operation, during the rotation, the threshing portions will accelerate and propel tailings received into the interior along a predetermined path therein, including against others of the tailings and against and along the interior surface for threshing the tailings. The conveyor includes a second rotary impeller supported for rotational about a second rotational axis in the cavity at a location downstream along the path from the first impeller, the second impeller including a plurality of blades extending radially outwardly from a second hub to radial outer threshing portions or tips of the blades, and a second drive connected in driving relation to the second hub for rotating the second impeller such that the threshing portions or tips will rotate at a predetermined second rotational speed greater than the first rotational speed. As a result of the greater rotational speed of the second impeller, the second impeller will further accelerate and propel the tailings against others of the tailings and against and along the interior surface and along the path for threshing the tailings, such that the tailings are progressively accelerated relative to their initial speed and are threshed as they are conveyed through the conveyor.

According to another preferred aspect of the invention, the first and second impellers are positioned in such that the radial outer threshing portions thereof counter rotate in closely spaced relation in a portion of the interior cavity so as to define a boundary of a conveying region of the cavity through which a portion of the predetermined path extends and in which it is desired for the tailings to be substantially contained. This is to prevent or significantly reduce the occurrence of build up of tailings in the region between the impellers which could lead to clogging and a reduction in the efficiency and throughput capacity of the conveyor.

According to another preferred aspect of the invention, the conveyor includes a third rotary impeller supported for rotation about a third rotational axis in the cavity at a location downstream along the path from the first and second impellers, the third impeller including a plurality of blades extending radially outwardly from a third hub to radial outer threshing portions, and a third drive connected in driving relation to the third hub for rotating the third impeller such that the threshing portions thereof will rotate at a predetermined third rotational speed greater than the second rotational speed and will further accelerate and propel the tailings against others of the tailings and against and along the interior surface and along the path for further threshing the tailings, and outwardly from the housing through the outlet opening. Alternatively, in the absence of the third impeller, the second impeller can be positioned for discharging the tailings through the outlet opening.

By rotating the radial outer threshing portions or tips of the blades of two or more successive impellers at progressively greater rotational speeds, that is, rotating the tips of the blades of successive ones of the impellers at speeds faster than the previous ones, the tailings are progressively accelerated. This, in combination with propelling the tailings in the turbulent manner, and by propelling the tailings against and along the interior surface of the housing and into the path of rotation of the next successive one of the impellers, has been found to reduce hesitation in the movement of the tailings through the conveyor while providing sufficient movements and collisions of the tailings for causing separation of grain, beans, seeds, kernels, and the like grain, which are desired to be collected, from husks, cobs, pods, stems, hulls and other portions of the plants being harvested.

DETAILED DESCRIPTION OF THE INVENTION

Figure 1:
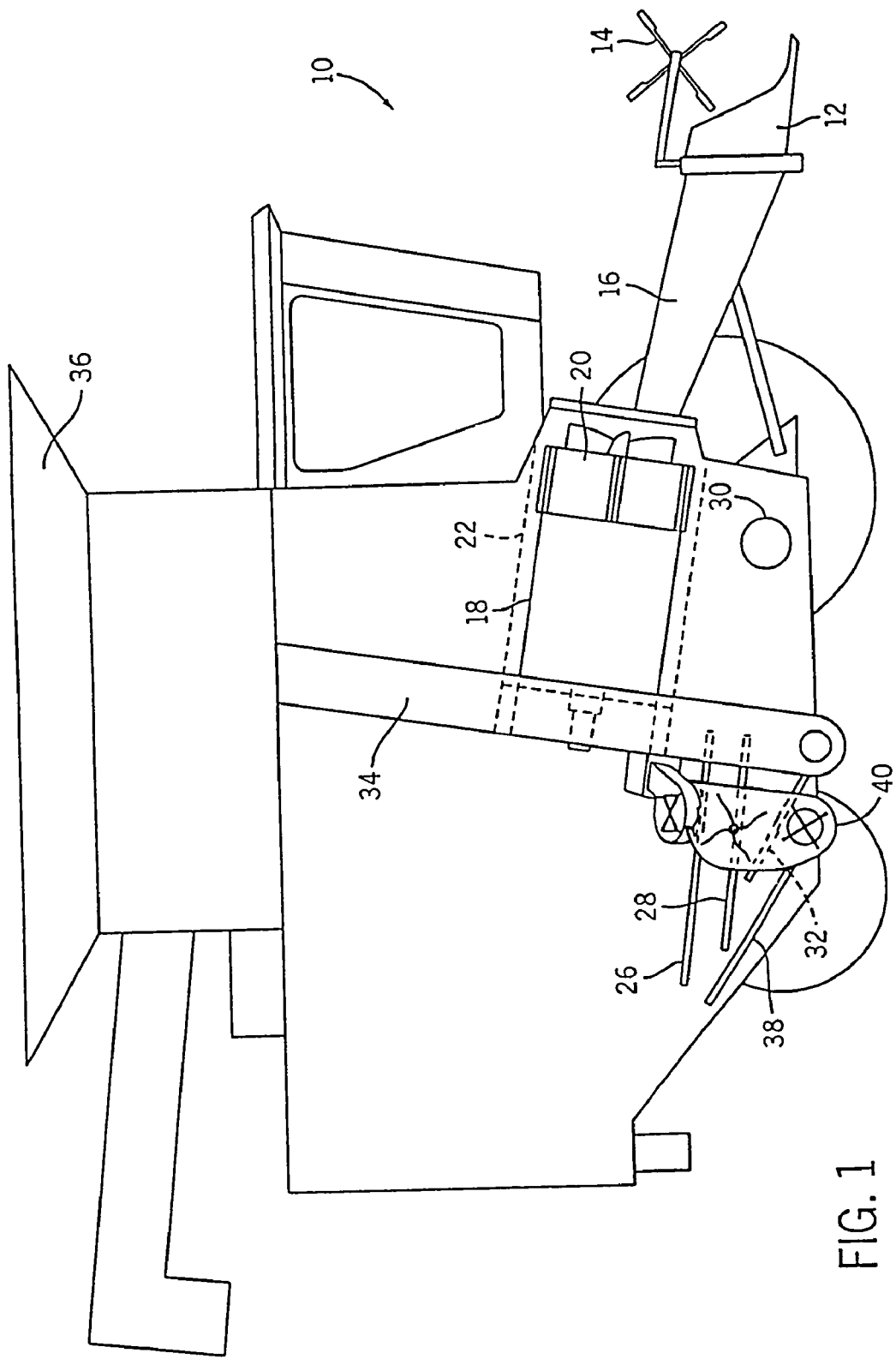
FIG. 1 is a simplified side view illustrating an embodiment of the major components of an agricultural harvesting machine.

Referring to FIG. 1, an agricultural harvesting machine 10, incorporating the principles of the instant invention, has a header 12, a reel 14, and a feeder 16. Crop material is collected by header 12 and reel 14 and taken into agricultural harvesting machine 10 through feeder 16 in a conventional manner.

A threshing assembly 18 includes a rotor 20 and a perforated housing 22. Rotor 20 is rotated within perforated housing 22. Crop is received from feeder 16 and is passed through clearances between rotor 20 and perforated housing 22 to thresh grain. Grain which is threshed in the clearances between housing 22 and rotor 20 falls through the perforations in housing 22 and is transported to a cleaning system 24 including a chaffer sieve 26 and a shoe sieve 28. Chaffer sieve 26 and shoe sieve 28 are members that oscillate back and forth. Sieves 26 and 28 have a plurality of apertures for allowing the properly threshed grain to fall through. A blower 30 blows air through sieves 26 and 28 and out the rear of agricultural harvesting machine 10. Chaff will be blown outward along with the air. The clean grain falls through sieves 26 and 28 onto an inclined plane 32. Clean grain travels along plane 32 and then through a grain elevator 34, to a grain storage area 36.

Grain and material other than grain (MOG) which can still contain or hold a significant amount of grain, and which is too heavy to become air borne and falls through chaffer sieve 26 but does not pass through shoe sieve 28 is commonly known as tailings. Tailings end up on a plane 38 and are rethreshed and conveyed in a tailings conveyor 40 and discharged from tailings conveyor 40 onto chaffer sieve 26.

As in best seen in FIG. 2–6, tailings conveyor 40 includes a housing 42 including an interior portion 43; a first opening 44 communicating with interior portion 43; a first rotary impeller 46 and a second rotary impeller 48 located in interior portion 43; and a second opening 50 communicating with interior 43 and a conduit 52. A third impeller 72 is located in conduit 52. The first and second impellers 46 and 48 are each rotated in predetermined rotational directions A on shafts 58 and 51, respectively, about substantially parallel rotational axes C and D extending longitudinally through the centers of shafts 58 and 51, respectively. The third impeller 72 may rotate in the opposite direction or as alternative in the same direction as the bottom two impellers 46 and 48.

Figure 3:
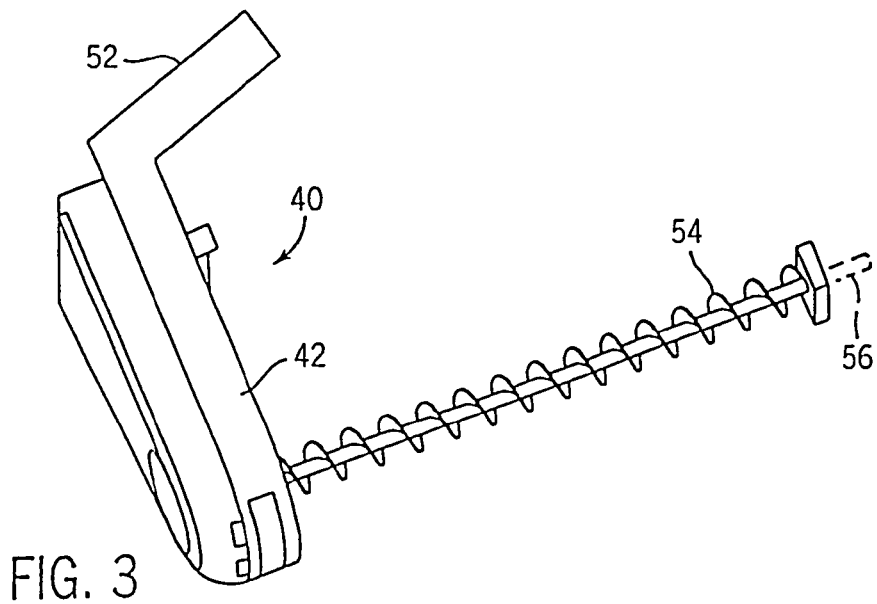
FIG. 3 is a perspective view of an embodiment of the conveyor of FIG. 2 in association with a feed auger of the machine for feeding tailings to the conveyor.
Figure 4:
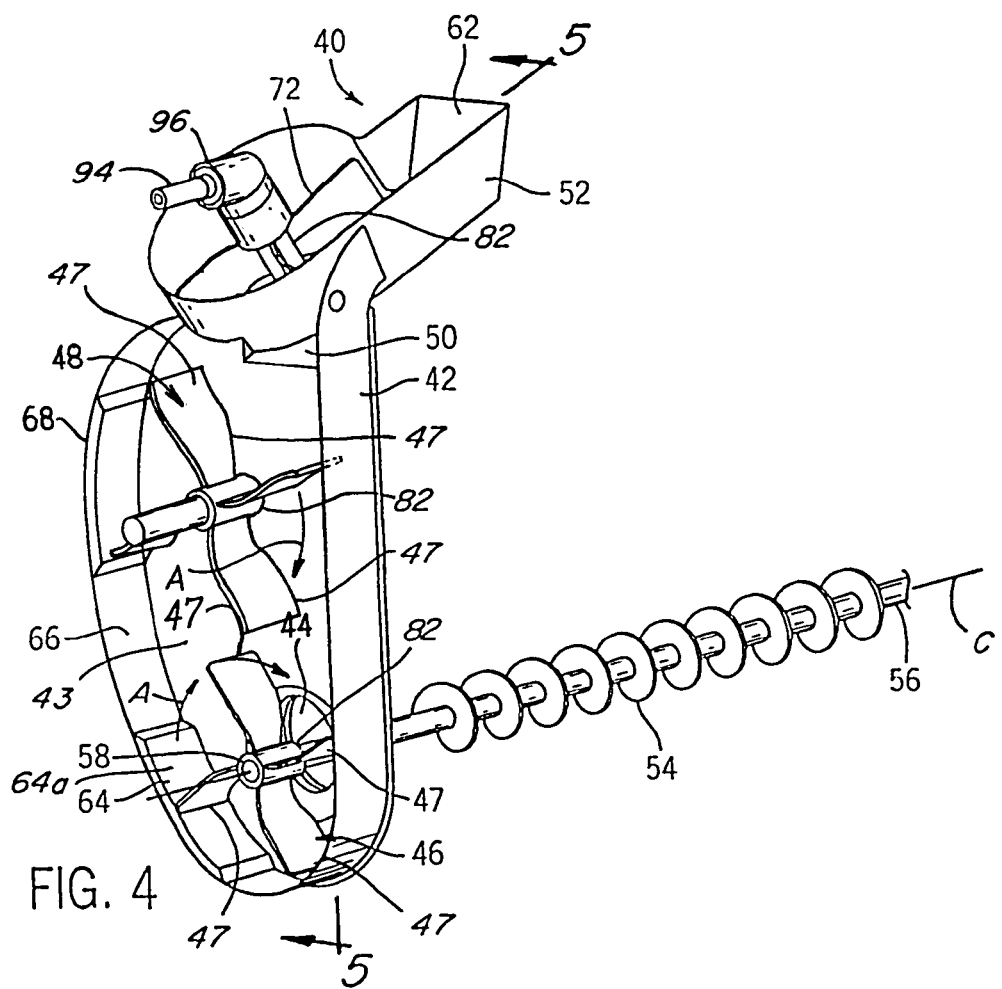
FIG. 4 is a simplified perspective view of the tailings conveyor of FIG. 2.

Housing 42 receives the tailings through first opening 44 by means of a rotatable auger 54, depicted in FIG. 3. Auger 54, as shown FIGS. 4, 5 and 6, rotates about rotational axis C on a shaft 56 coaxial with shaft 58 for moving the tailings toward tailings conveyor 40, such that the tailings will be discharged by auger 54 through first opening 44 into interior portion 43 of housing 42 in a position to be propelled by rotating first impeller 46 through interior portion 43 to second impeller 48. As an alternative, first opening 44 can be offset from the shaft 58, such as depicted at 44a in FIG. 6, so that, for instance, tailings 60 are delivered into housing 42 at a lower location or more in the vicinity of the radial outer portion of first impeller 46.

Figure 6:
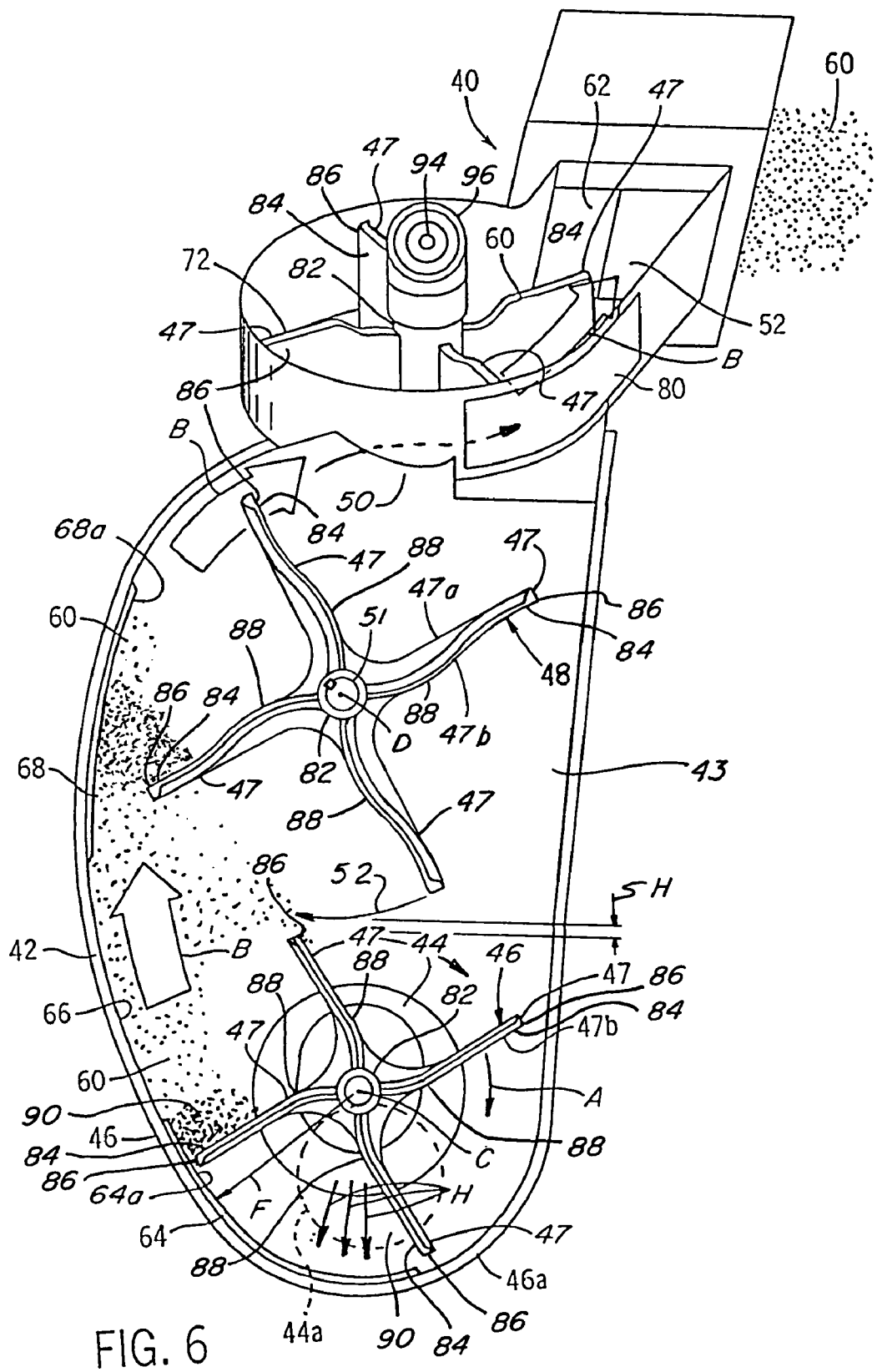
FIG. 6 is a frontal view of the tailings conveyor housing of FIG. 2 with the front cover removed and illustrating impellers of the conveyor for propelling tailings through the conveyor in a turbulent manner for threshing the tailings.

First impeller 46, second impeller 48, and third impeller 72 each include a plurality of blades 47 extending generally radially outwardly relative to the rotational axis of the respective impeller. Each of the blades 47 is preferably curved or arcuate so as to have a concave surface 47a facing oppositely of the rotational direction A, and a convex surface 47b facing forwardly in or toward the rotational direction A. The radial outer ends of blades 47 of first impeller 46 are preferably swept back relative to the rotational direction A, as best shown in FIG. 6. The radial outer ends of blades 47 of second impeller 48 preferably extend more directly radially outwardly.

The impellers 46, 48 and the second opening 50 are preferably radially in-line or aligned, such that tailings 60 which enter housing 42 at opening 44, or 44a, are propelled in rotational direction A by first impeller 46 along a predetermined path of movement along and defined largely by a radially inwardly facing threshing surface 64a of a first threshing plate 64, and into the path of rotation of radially adjacent second impeller 48, as denoted by large arrow B. Second impeller 48 will then propel tailings 60 in direction A further along a radially inwardly facing threshing surface 68a of a second threshing plate 68, and through second opening 50 into conduit 52 into the path of rotation of third impeller 72, as also denoted by a large arrow B. Third impeller 72 will then propel tailings 60 along the path of movement through conduit 52, again as denoted by a large arrow B, so as to exit through a discharge outlet 62, so as to be spread over a predetermined region of chaffer sieve 26, or another location if desired. In interior portion 43 of housing 42, a radially inwardly facing common housing wall 66 guides and enhances the radial direction of travel of tailings 60 from first impeller 46 to second impeller 48. In conduit 52, a third threshing plate 80 can be provided having a radially inwardly facing threshing surface (not shown) for facilitating threshing by third impeller 72, and for guiding the tailings flow to conduit 52.

The preferred rotational direction A for both of impellers 46 and 48 is clockwise. The preferred rotation of impeller 72 is counterclockwise, however clockwise will also suffice. The curved or arcuate or swept back shape of blades 47 of impeller 46 has been found to cause a more aggressive threshing of tailings 60 and forces the tailings 60 to the radially outer portion of the blades 47 faster, which has been found to increase conveying capacity. Threshing plate surfaces 64a, 68a and 80 may each have a rough surface texture or smooth, and/or can include elements such as raised protuberances and the like, for imparting a desired turbulence to the tailings flow, for performing a desired threshing function, as discussed in more detail below.

Impellers 46, 48 and 72 each includes a mounting portion 82 which is preferably a hub, mountable to a rotatable member, such as shaft 58 of conveyor 40 in the instance of impeller 46, for rotation with the rotatable member in a predetermined rotational direction, such as direction A, about a rotational axis, such as axis C, as best shown in FIG. 6. Each impeller 46, 48 and 72 includes a plurality of blades 47, preferably four in number, which extend generally radially outwardly from mounting portion 82 at equally spaced locations around the rotational axis. As noted before, each blade 47 includes a surface 47a facing in a direction opposite the rotational direction, and a surface 47b facing in the rotational direction.

Surface 47b of each blade 47 of impellers 46, 48 and 72 includes a radially outer threshing portion 84 facing in rotational direction A and terminating at a radially outermost tip portion 86, and a tailings deflecting portion 88 which generally encompasses the convex region of the blade between threshing portion 84 and mounting portion 82. In operation, as tailings 60 are inducted into interior portion 43 of housing 42 through opening 44 or 44a, elements of the tailings, which will generally include some individual loose grain, grain partially or fully contained in pods or pod fragments, small straw pieces, pod fragments, and other plant fragments, will be impacted by surface 47b and propelled or driven in direction A. In this context, it has been found that as a result of the convex shape of deflecting portion 88 of each blade, tailings 60 impacted thereby will be propelled or driven generally tangentially radially outwardly and forwardly, as illustrated by arrows H in FIG. 6, into the path of threshing portions 84 of blades 47. This will occur in a relatively turbulent manner, such that the individual tailings will collide randomly with each other and with threshing portion 84, and also with threshing surface 64a. As a result, at least some of the pods and pod fragments containing grain will be broken open to release the grain therefrom, for eventual cleaning or separation from the MOG in the cleaning system.

To facilitate or accentuate this threshing action, each blade 47 has a predetermined radial extent as measured from the center of mounting portion 82 to tip portion 86 of the blade, which is a predetermined amount less than a predetermined minimum radial distance to the corresponding threshing surface 64a or 68a, as illustrated by distance F from axis C to threshing surface 64a (FIG. 6). As a result, the spacing between tip portions 86 of the blades and the threshing surface 64a or 68a can be controlled, as desired or required for a particular application. In this regard a wide range of spacings can be utilized. For instance, a non-limiting representative range of spacings is from as little as about 1 mm to 2.5 mm or larger, it being mainly desired that the tailings will be carried or driven by tip portion 86 over surface 64a or 68a in a turbulent manner and as a result will roll and tumble along surface 64a and be otherwise agitated so as to collide with the other tailings and threshing surfaces 64a, 68a and 84, and tip portion 86, such that at least some portion of remaining intact pods and other grain holding plant fragments will be broken open to release the grain therefrom.

As another result of the movement and action set forth above, some of the tailings, which have some abrasive properties, will pass and/or be dragged through the space between surface 64a or 68a and tip portions 86, such that wear of the affected surfaces will occur with use, particularly surface 64a and the surfaces of tip portions 86 facing in direction A. To maintain the radial length of blades 47 and provide desired impeller effective life under anticipated wear conditions, tip portions 86 each preferably have an enhanced thickness or extent in direction A which is greater compared to the extent of most other portions of blade 47 in direction A. As a result, even as tip portions 86 wears or abrades away, the radial extent of blade 47 will remain substantially the same. Also, threshing plate 64, or at least the portion thereof including threshing surface 64a, is preferably removable and replaceable and/or reversible.

Here, it should be noted that by virtue of the convex shape of blades 47 of impeller 46 in the region of tailings deflecting portions 88, threshing portions 84 and tips 86 are swept back relative to direction A. This, in combination with threshing surface 64a, defines a space 90 forwardly of threshing portion 84 of each blade 47 in direction A (FIG. 6) where much of the above discussed turbulence and resultant threshing action takes place. The swept back configuration also facilitates accelerating and shedding of the tailings off of tip portions 86 of the blades after passing surface 64a, so as to be propelled toward second impeller 48.

In contrast to the shape of blades 47 of impeller 46, blades 47 of second impeller 48, although having a convex shape deflecting portion 88, preferably have a threshing portion 84 and tip portion 86 which are substantially directly radially outwardly extending, that is, which is not, or much less, swept back relative to deflecting portion 88, but instead is essentially perpendicular in respect to rotational direction A. As a result, blades 47 of impeller 48 will shed tailings to a lesser extent, compared to swept back blades 47 of impeller 46. This provides even greater acceleration of the tailings. Blades 47 of impeller 48 also have a greater length, such that impeller 48 has a greater diametrical extent compared to impeller 46. As a result, for a given rotational speed, threshing portions 84 and tip portions 86 of impeller 48 will move faster than the corresponding portions of impeller 46, which will provide greater acceleration of tailings.

Figure 2:
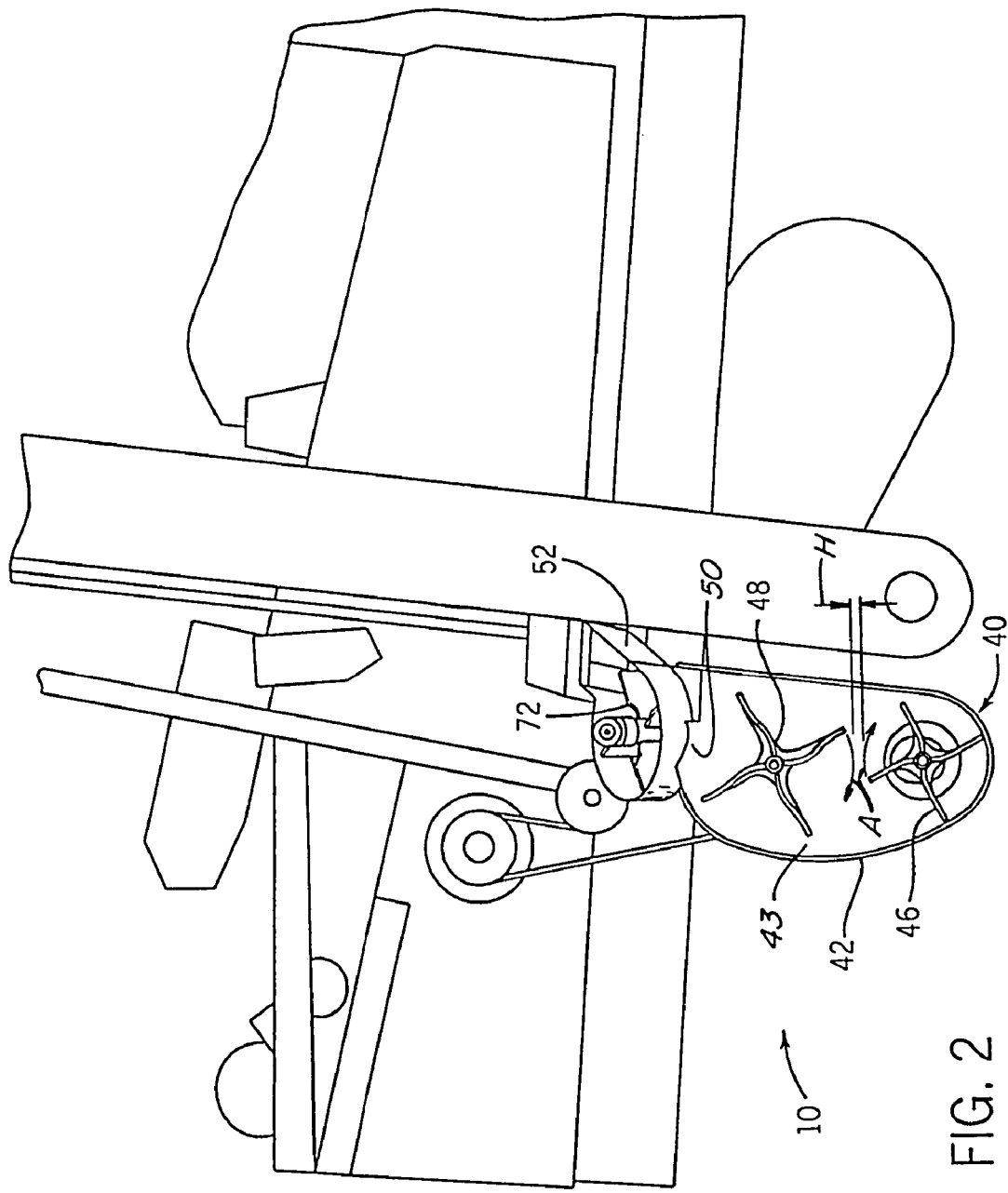
FIG. 2 is a more detailed view of the harvesting machine of FIG. 1 depicting an embodiment of a tailings conveyor according to the invention within the machine with a front cover of the conveyor removed to show internal aspects thereof.
Figure 5:
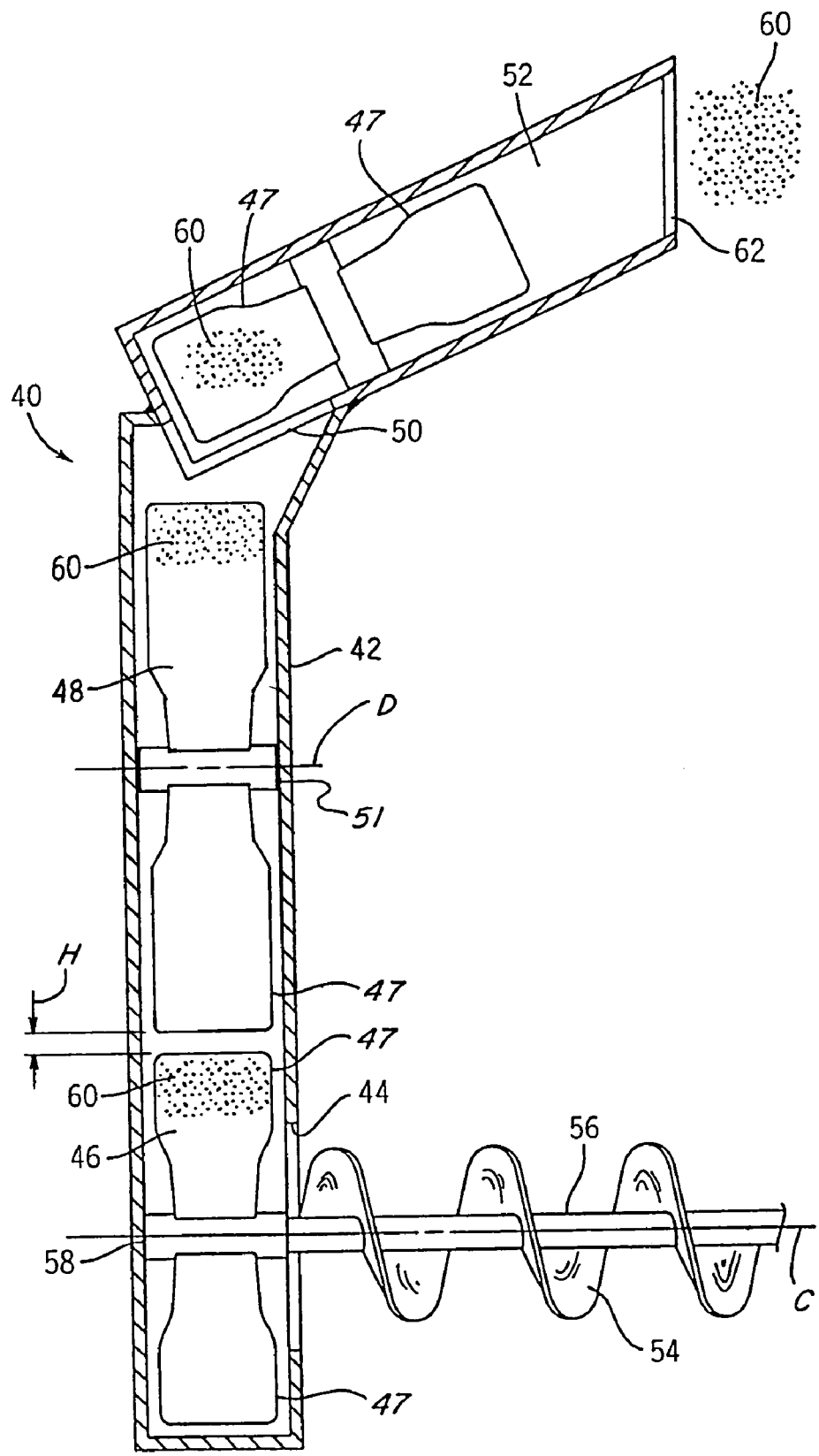
FIG. 5 is a simplified perspective view of the tailings conveyor taken along line 5—5 of FIG. 4.

As another feature for facilitating flow of the tailings along path B from impeller 46 to impeller 48, those impellers are positioned one relative to the other such that only a minimal space, denoted at H in FIGS. 2, 5 and 6, exists between tip portions 86 of the impellers, effectively defining a threshing region to the left of impellers 46 and 48 in FIG. 6, generally including and in proximity to large arrows B. An exemplary range of values of space H is from about 6 to 50 mm. An advantage of such a small space H is that as the close tip portions 86 of impellers 46 and 48 counter rotate, only a minimal amount of tailings are allowed to pass from the threshing region therebetween, such that the tailings have less of a tendency to collect or mass around the radial outer periphery of impellers 46 and 48.

Additionally, impeller 48 is preferably rotated at a faster rotational speed than impeller 46, and impeller 72 is preferably rotated at a faster rotational speed than both impeller 46 and impeller 48. As a result of this progression of faster rotational speeds in combination with the other features of impellers 46, 48 and 72, particularly the closely spaced relationship between tip portions 86 of impellers 46 and 48 (space H), tailings 60 are continually or progressively accelerated along path B through interior 43 and conduit 52, with little or no hesitation or stalling in the transition regions between the impellers, generally in the location of the large arrows B in FIG. 6.

Figure 7:
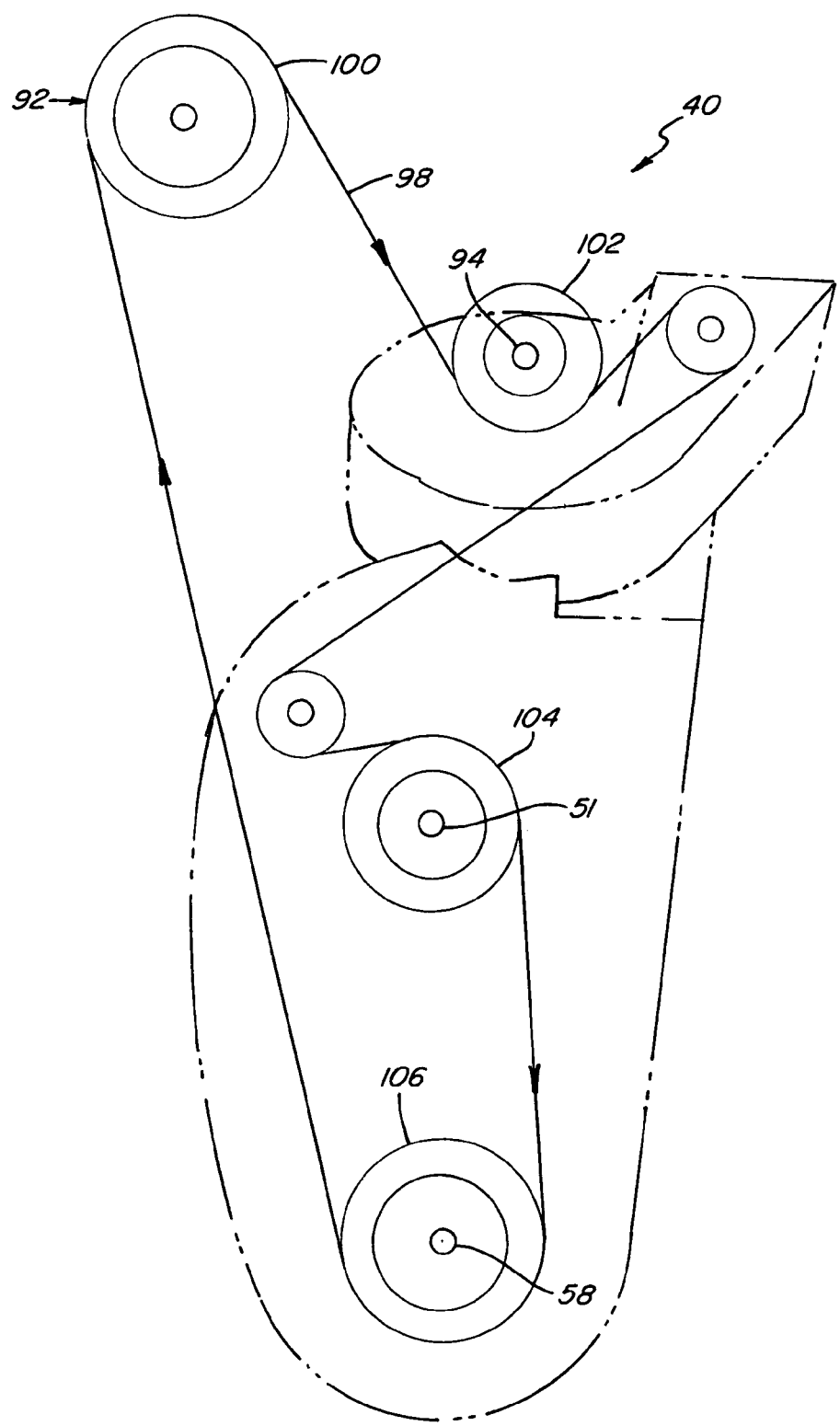
FIG. 7 is a simplified schematic frontal view of one belt drive arrangement for the impellers of the tailings conveyor.

Referring also to FIG. 7, a representative drive arrangement 92 for rotatably driving shafts 58 and 51 for rotating impellers 46 and 48 (FIGS. 2, 4, 5 and 6), and for rotating an input shaft 94 of an angle gear box 96 (FIGS. 4 and 6) connected in rotatably driving relation to impeller 72, is shown. Drive arrangement 92 includes a serpentine belt 98 which encircles an input pulley 100 and pulleys 102, 104 and 106 connected to shafts 94, 51 and 58, respectively. Input pulley 100 is connectable in the well known manner in rotatably driven relation, to a rotatable power source such as a fluid motor, an electric motor, an engine of combine 10, transmission, or the like (not shown). Pulley 106 is larger in diameter than pulley 104, and pulley 104 is larger in diameter than pulley 102, such that for a given rotational speed of input pulley 100, impeller 72 will rotate faster than impeller 48, and impeller 48 will rotate faster than impeller 46, to provide the desired progression of rotational speeds.

Here, it should be noted that third impeller 72 will preferably be constructed the same and operate essentially the same as first impeller 46, although it should also be noted that impellers 48 and 72 could be constructed differently, as required for providing different operating characteristics, as desired or required.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A tailings conveyor for an agricultural combine, comprising:

a housing including an interior cavity, an inlet opening connecting with the cavity for receiving tailings from the cleaning system into the cavity, and an outlet opening for discharging the tailings from the cavity;

a first rotary impeller supported for rotation about a first rotational axis in the cavity at a position adjacent to the inlet opening and an interior surface of the housing, the first impeller including a plurality of blades extending radially outwardly from a first hub to radial outer threshing portions of the first impeller, and a first drive connected in driving relation to the first hub for rotating the first impeller such that the threshing portions thereof will rotate at a predetermined first rotational speed, such that during the rotation the threshing portions will accelerate and propel tailings received into the interior along a predetermined path therein, including against others of the tailings and against and along the interior surface for threshing the tailings; and a second rotary impeller supported for rotational about a second rotational axis in the cavity at a location downstream along the path from the first impeller, the second impeller including a plurality of blades extending radially outwardly from a second hub to radial outer threshing portions of the second impeller, and a second drive connected in driving relation to the second hub for rotating the second impeller such that the threshing portions thereof will rotate at a predetermined second rotational speed greater than the first rotational speed and will accelerate and propel the tailings against others of the tailings and against and along the interior surface and along the path for threshing the tailings.

2. The tailings conveyor of claim 1, wherein the radial outer threshing portions of the first and second impellers counter rotate in closely spaced relation in a portion of the interior cavity so as to define a boundary of a threshing region of the cavity through which a portion of the predetermined path extends and for substantially containing the tailings to the portion of the predetermined path.

3. The tailings conveyor of claim 1, wherein the threshing portions of at least one of the impellers circumscribe an arc when said impeller is rotated and the interior surface has a curve shape marginally larger in diameter than the arc and is located radially outwardly thereof such that when the at least one of the impellers is rotated the threshing portions thereof will move along the surface to propel the tailings thereagainst so as to be deflected thereby in a turbulent manner.

4. The tailings conveyor of claim 1, further comprising a third rotary impeller supported for rotation about a third rotational axis in the cavity at a location downstream along the path from the first and second impellers, the third impeller including a plurality of blades extending radially outwardly from a third hub to radial outer threshing portions of the third impeller, and a third drive connected in driving relation to the third hub for rotating the third impeller such that the threshing portions thereof will rotate at a predetermined third rotational speed greater than the second rotational speed and will accelerate and propel the tailings against others of the tailings and against and along the interior surface and along the path for further threshing the tailings.

5. The tailings conveyor of claim 4, wherein the third impeller is positioned in the interior cavity for propelling the tailings therefrom through the outlet opening.

6. The tailings conveyor of claim 4, wherein the first rotational axis and the second rotational axis are generally parallel, and the third rotational axis is oriented at an acute angle to the first and second rotational axes.

7. The tailings conveyor of claim 1, wherein the threshing portions of the second impeller have a diametrical extent through the second rotational axis greater than a diametrical extent of the threshing portions of the first impeller through the first rotational axis.

8. The tailings conveyor of claim 1, wherein the interior surface has a surface texture configured for deflecting the tailings in the turbulent manner.

9. The tailings conveyor of claim 8, wherein the interior surface includes small elements thereon having randomly facing surfaces and sharp edges for deflecting the tailings in a random manner therefrom.

10. The tailings conveyor of claim 8, wherein the interior surface includes a plurality of raised weld beads at spaced locations thereon for deflecting the tailings along the predetermined path in a random manner.

11. The tailings conveyor of claim 1, wherein the threshing portions of the first impeller have a swept back orientation relative to a direction of rotation of the first impeller, the threshing portions of the second impeller are oriented so as to extend substantially directly radially outwardly from the second hub, and the impellers are sufficiently close together such that when the first and second impellers are rotated in one rotational direction the threshing portions of the first impeller will propel some of the tailings into a path of rotation of the threshing portions of the second impeller.

12. The tailings conveyor of claim 1, wherein the threshing portions of the first and second impellers each comprise a generally planar surface facing in the rotational direction.

13. A tailings conveyor for conveying and threshing tailings from a cleaning system of an agricultural combine, comprising:

a housing including an interior cavity, an inlet opening connecting with the cavity for receiving tailings from the cleaning system into the cavity, and an outlet opening for discharging the tailings from the cavity;

a first rotary impeller supported for rotation in a predetermined direction about a first rotational axis in the cavity at a location adjacent to the inlet opening, the first impeller including a plurality of substantially rigid blades including radial outer threshing portions disposed to rotate adjacent to an interior threshing surface of the housing, and a first drive connected in driving relation to the first impeller for rotating the first impeller such that the threshing portions thereof will rotate at a predetermined first rotational speed;

a second rotary impeller supported for rotation in a predetermined direction about a second rotational axis in the cavity at a location generally between the first impeller and the outlet opening, the second impeller including a plurality of substantially rigid blades including radial outer threshing portions disposed to rotate adjacent to the interior threshing surface of the housing, and a second drive connected in driving relation to the second impeller for rotating the second impeller such that the threshing portions thereof will rotate at a predetermined second rotational speed greater than the first rotational speed; and wherein when the impellers are rotated and tailings are introduced into the interior cavity through the inlet opening, the tailings will be accelerated and propelled by the first impeller from the inlet opening in a turbulent manner along the interior threshing surface generally toward the outlet opening and into a path of rotation of the second impeller so as to be further accelerated and propelled by the second impeller in a turbulent manner along the threshing surface toward the outlet opening.

14. The tailings conveyor of claim 13, wherein the radial outer threshing portions of the first and second impellers counter rotate in closely spaced relation in a portion of the interior cavity so as to define a boundary of a threshing region of the cavity through which the tailings will be accelerated and propelled in the turbulent manner.

15. The tailings conveyor of claim 13, further comprising a third rotary impeller supported for rotation about a third rotational axis in the cavity at a location between the second impeller and the outlet opening, the third impeller including a plurality of blades including radial outer threshing portions, and a third drive connected in driving relation to the third impeller for rotating the third impeller such that the threshing portions thereof will rotate at a predetermined third rotational speed greater than the second rotational speed so as to further accelerate and propel the tailings against others of the tailings and outwardly from the interior cavity through the outlet opening.

16. The tailings conveyor of claim 15, wherein the first rotational axis and the second rotational axis are generally parallel, and the third rotational axis is oriented at an acute angle to the first and second rotational axes.

17. The tailings conveyor of claim 13, wherein the threshing portions of the second impeller have a diametrical extent through the second rotational axis greater than a diametrical extent of the threshing portions of the first impeller through the first rotational axis.

18. The tailings conveyor of claim 13, wherein the threshing surface has a surface texture configured for deflecting the tailings in the turbulent manner.

19. The tailings conveyor of claim 18, wherein the threshing surface includes small elements thereon having randomly facing surfaces and sharp edges for deflecting the tailings in a random manner therefrom.

20. The tailings conveyor of claim 18, wherein the threshing surface includes a plurality of raised weld beads at spaced locations thereon for deflecting the tailings in a random manner.

21. The tailings conveyor of claim 13, wherein the threshing portions of the first impeller have a swept back orientation relative to the direction of rotation of the first impeller, the threshing portions of the second impeller are oriented so as to extend substantially directly radially outwardly from the second hub, and the impellers are sufficiently close together such that when the first and second impellers are rotated the threshing portions of the first impeller will propel some of the tailings into a path of rotation of the threshing portions of the second impeller.

22. The tailings conveyor of claim 13, wherein the threshing portions of the first and second impellers each comprise a generally planar surface facing in the rotational direction.

23. A method of conveying and threshing tailings from a cleaning system of an agricultural combine, comprising steps of:

(a) providing a housing including an interior cavity, an inlet opening connecting with the cavity for receiving tailings from the cleaning system into the cavity, and an outlet opening for discharging the tailings from the cavity;

(b) providing a first rotary impeller supported for rotation in a predetermined direction about a first rotational axis in the cavity at a location adjacent to the inlet opening, the first impeller including a plurality of substantially rigid blades including radial outer threshing portions disposed to rotate adjacent to an interior threshing surface of the housing, and a first drive connected in driving relation to the first impeller for rotating the first impeller such that the threshing portions thereof will rotate at a predetermined first rotational speed;

(c) providing a second rotary impeller supported for rotation in a predetermined direction about a second rotational axis in the cavity at a location generally between the first impeller and the outlet opening, the second impeller including a plurality of substantially rigid blades including radial outer threshing portions disposed to rotate adjacent to the interior threshing surface of the housing, and a second drive connected in driving relation to the second impeller for rotating the second impeller such that the threshing portions thereof will rotate at a predetermined second rotational speed greater than the first rotational speed; and (d) rotating the impellers and introducing tailings into the interior cavity through the inlet opening, such that the first impeller will accelerate and propel tailings introduced into the interior cavity from the inlet opening in a turbulent manner along the interior threshing surface generally toward the outlet opening and into a path of rotation of the second impeller, and such that the second impeller will further accelerate and propel the tailings in a turbulent manner along the threshing surface toward the outlet opening.

24. The method of claim 23, further comprising the steps of:

(e) providing a third rotary impeller supported for rotation about a third rotational axis in the cavity at a location between the second impeller and the outlet opening, the third impeller including a plurality of blades including radial outer threshing portions, and a third drive connected in driving relation to the third impeller for rotating the third impeller such that the threshing portions thereof will rotate at a predetermined third rotational speed greater than the second rotational speed; and (f) rotating the third impeller so as to further accelerate and propel the tailings against others of the tailings and outwardly from the interior cavity through the outlet opening.

* * * * *